(12) United States Patent
Yamada et al.

(10) Patent No.: US 10,494,554 B2
(45) Date of Patent: Dec. 3, 2019

(54) WATER- AND OIL-REPELLENT COATING FILM AND ARTICLES HAVING THIS COATING FILM

(71) Applicants: TOYO ALUMINIUM KABUSHIKI KAISHA, Osaka-shi (JP); NIPPON AEROSIL CO., LTD., Shinjuku-ku (JP)

(72) Inventors: Kazunori Yamada, Osaka (JP); Tomonobu Sekiguchi, Osaka (JP); Hiroyuki Nishikawa, Osaka (JP); Hiroshi Oe, Osaka (JP); Yuya Terasawa, Osaka (JP); Masahiko Kamada, Yokkaichi (JP); Toshio Morii, Yokkaichi (JP); Yusuke Tosaki, Yokkaichi (JP); Yukiya Yamashita, Yokkaishi (JP)

(73) Assignees: TOYO ALUMINIUM KABUSHIKI KAISHA, Osaka-shi (JP); NIPPON AEROSIL CO., LTD., Shinjuku-ku (JP)

( * ) Notice: Subject to any disclaimer, the term of this patent is extended or adjusted under 35 U.S.C. 154(b) by 0 days.

(21) Appl. No.: 14/237,534

(22) PCT Filed: Jun. 7, 2013

(86) PCT No.: PCT/JP2013/065864
§ 371 (c)(1),
(2) Date: Feb. 6, 2014

(87) PCT Pub. No.: WO2014/057712
PCT Pub. Date: Apr. 17, 2014

(65) Prior Publication Data
US 2015/0247079 A1    Sep. 3, 2015

(30) Foreign Application Priority Data
Oct. 13, 2012    (JP) .................................. 2012-227541

(51) Int. Cl.
*C09K 3/18* (2006.01)
*C09C 3/10* (2006.01)
*C09D 133/16* (2006.01)

(52) U.S. Cl.
CPC ................. *C09K 3/18* (2013.01); *C09C 3/10* (2013.01); *C09D 133/16* (2013.01);
(Continued)

(58) Field of Classification Search
CPC .......... B82Y 30/00; B22F 1/01; B22F 1/0055; B22F 1/0062; B22F 2207/01; B32B 2307/73
(Continued)

(56) References Cited

U.S. PATENT DOCUMENTS 2,803,615 A * 8/1957 Ahlbrecht et al. ............ 524/805
7,879,743 B2 * 2/2011 Bringley ................ B82Y 30/00
442/79

(Continued)

FOREIGN PATENT DOCUMENTS

CA    2309957 A1    5/1999
EP    1043380 A1    10/2000
(Continued)

OTHER PUBLICATIONS

Super-liquid-Repellent Surfaces Prepared by Colloidal Silica Nanoparticles Covered with Fluoroalkyl Groups, Langmuir, 21, (2005) 7299-7302.*
(Continued)

*Primary Examiner* — Frank J Vineis
*Assistant Examiner* — Alicia J Sawdon
(74) *Attorney, Agent, or Firm* — Locke Lord LLP

(57) ABSTRACT

Provided is a coating film that can more reliably exhibit an excellent water repellency and an excellent oil repellency. This water- and oil-repellent coating film is a coating film (Continued)

formed on a surface of a material in order to impart water repellency and oil repellency, wherein (1) the coating film contains a metal oxide-containing composite particle; (2) the composite particle contains a) a metal oxide particle and b) a covering layer that contains a polyfluoroalkyl methacrylate resin and is formed on the surface of the metal oxide particle; and (3) a value obtained by dividing the fluorine content (weight %) of the composite particle by a surface area ($m^2/g$) of the metal oxide particle is 0.025 to 0.180.

13 Claims, 2 Drawing Sheets

(52) U.S. Cl.
CPC .................. *Y10T 428/2438* (2015.01); *Y10T 428/249986* (2015.04); *Y10T 428/254* (2015.01)

(58) Field of Classification Search
USPC .......................................... 428/144, 403, 407
See application file for complete search history.

(56) References Cited

U.S. PATENT DOCUMENTS

| | | | |
|---|---|---|---|
| 2003/0049475 A1* | 3/2003 | Su | B32B 27/18 428/515 |
| 2005/0227077 A1 | 10/2005 | Sugiyama | |
| 2011/0008613 A1 | 1/2011 | Takano et al. | |

FOREIGN PATENT DOCUMENTS

| | | |
|---|---|---|
| JP | 9-194789 A | 7/1997 |
| JP | 9-296134 A | 11/1997 |
| JP | 2000-169835 A | 6/2000 |
| JP | 2003-213157 A | 7/2003 |
| JP | 2004-168846 A | 6/2004 |
| JP | 2009-191407 A | 8/2009 |
| JP | 2009-198748 A | 9/2009 |
| JP | 2009-215411 A | 9/2009 |
| JP | 2010-089373 A | 4/2010 |
| JP | 2011-073744 A | 4/2011 |
| JP | 2011-140625 A | 7/2011 |
| JP | 2012-96188 A | 5/2012 |
| KR | 1020010031471 A | 4/2001 |

OTHER PUBLICATIONS

Hikita et al. "Super-Liquid-Repellent Surfaces Prepared by Colloidal Silica Nanoparticles Covered with Fluoroalkyl Groups", 2005, 21, 7299-7302.*

Evonic Industries, Technical Information, Safety Summary-Tetraethylorthosilicate, 2010, 1, 1-6.* http://www.thefreedictionary.com/void (accessed Sep. 13, 2016).*

Brassard et al. (ACS Appl. Mater. Interfaces, 3(9), 2011, pp. 3583) published Aug. 29, 2011.*

U.S. Food and Drug Administration, Inventory of Effective Food Contact Substance Notifications FCN No. 599, effective Jun. 29, 2006.*

Nandanwar et al. (International Journal of Chemical and Physical Sciences, Effect of Solvents on the Morphological and Optical Properties of SiO2 Film Prepared by.*

Duncan, E.J. (Chemistry of Materials; Superamphiphobic Diblock Copolymer Coatings, 23: Sep. 6, 2011). (Year: 2011).*

SiSiB silicones (Fumed Silica, Power Chemical Corporation Limited, Jun. 2009). (Year: 2009).*

* cited by examiner

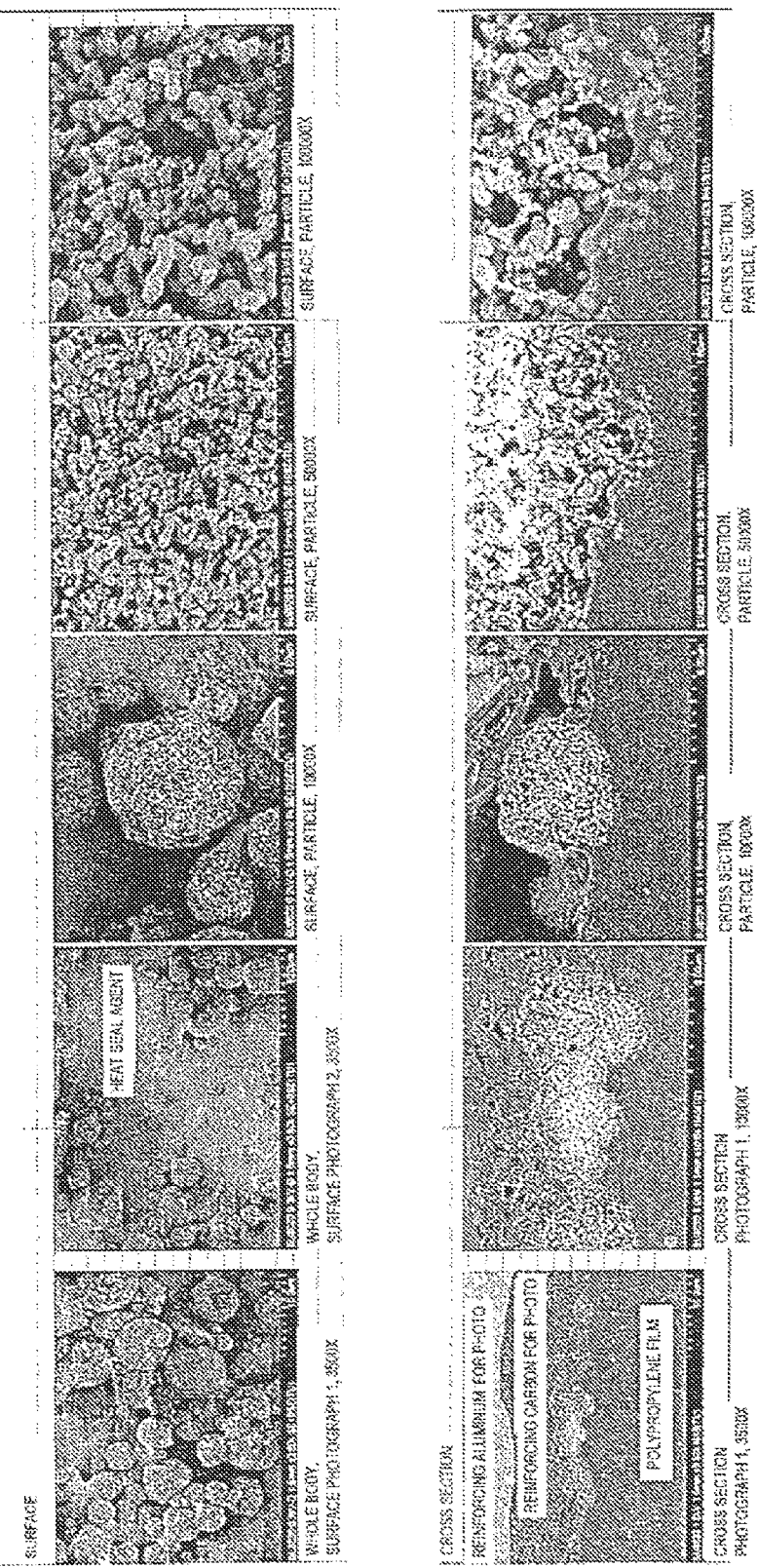

WATER- AND OIL-REPELLENT COATING FILM AND ARTICLES HAVING THIS COATING FILM

The present application is the U. National Phase of International Patent Application Serial No. PCT/JP2013/065864, filed on Jun. 7, 2013, which claims priority to Japanese Patent Application Serial Nos. 2012-227541, filed Oct. 13, 2012. The content of the foregoing applications are incorporated herein by reference in their entireties.

TECHNICAL FIELD

The present invention relates to a water- and oil-repellent coating film and to articles that have this coating film.

BACKGROUND ART

A variety of articles, for example, packaging materials (for example, containers, wrapping paper, trays, tubes, bags, and pouches) as well as structures, textiles, and toys, are known as articles whose surface has been endowed with water repellency and oil repellency. The packaging materials are used with, for example, foods, beverages, medicines, cosmetics, and chemicals, such as jelly confections, puddings, yogurts, liquid cleansers and detergents, toothpastes, curry roux, syrups, petroleum jellies, facial cleansing creams, and facial cleansing mousse. In addition, the content can have various forms, such as solid, semisolid, liquid, viscous material and gel. Water repellency or oil repellency is imparted, in conformity with the nature of the content, to the surface in contact with the content in order to prevent attachment of the content to the greatest extent possible.

For example, methods in which coating is carried out with, e.g., a fluorinated compound, are used as a means for imparting water repellency and oil repellency.

For example, the oilproof packaging material disclosed in Patent Document 1 is made by laminating at least the following three layers in the indicated sequence: (A) a thermoplastic resin layer in which upper surface pores (x) having a pore diameter of 0.2 to 0.6 mm have been executed in advance; (B) an oilproof paper that incorporates an oilproofing agent in which the number of carbons in the perfluoroalkyl group is less than 8; and (C) a heat-sealable thermoplastic resin layer in which back surface pores (y) having a pore diameter of 0.2 to 0.6 mm have been executed in advance.

Patent Document 2 provides a water- and oil-repellent base material that characteristically comprises the following first layer formed on a surface of a base material and the following second layer formed on the surface of the first layer: for the first layer, a silica fine particle-containing layer of the cured product from a curable paint; for the second layer, a layer formed from a composition in which the essential components are a fluorosilicone compound and a solvent, or a layer formed from the cured product of such a composition.

Patent Document 3 discloses a packaging material for a deoxygenating agent, an ethanol pervaporation agent, or a desiccant for preserving the freshness of food. This packaging material is characterized by a two-layer coating provided by first coating the surface on at least one side of an air-permeable paper base material with a urethane-type or vinyl chloride acetate-type transparent ink that uses an isocyanate-type curing agent and then applying a fluorine-type water- and oil-repellent agent on this urethane-type or vinyl chloride acetate-type transparent ink layer.

With regard to the art of coating with such fluorinated compounds, methods have also been introduced in which coating is carried out with a liquid dispersion that contains fine particles and an oil-repellent agent.

For example, a method of producing an oil-repellent coated article is disclosed in Patent Document 4, wherein this method characteristically comprises (1) a first step in which fine particles having a particle diameter of at least 100 nm are produced by the sol-gel method and (i) an article to be coated is immersed in a liquid dispersion in which the fine particles are dispersed and is withdrawn and dried or (ii) a liquid dispersion in which the fine particles are dispersed is sprayed on the article to be coated and drying is carried out; and (2) a second step in which (i) the article to be coated is then immersed in a liquid dispersion that contains fine particles with a particle diameter of 7 to 90 nm and a perfluoroalkylsilane as an oil-repellent agent and is withdrawn and dried or (ii) the article to be coated is sprayed with a liquid dispersion containing fine particles with a particle diameter of 7 to 90 nm and an oil-repellent agent and drying is carried out.

There is disclosed in Patent Document 5 a water- and oil-repellent coated article that is a coated article obtained by the application of a coating composition that contains alcohol, an alkoxysilane, a perfluoroalkylsilane, silica fine particles, a catalyst that promotes the hydrolysis reaction of alkoxysilanes, and water, wherein the root-mean-square roughness (RMS) value for the surface of this coated article is at least 100 nm.

Patent Document 1: Japanese Patent Application Publication No. 2011-73744

Patent Document 2: Japanese Patent Application Publication No. 2000-169835

Patent Document 3: Japanese Patent Application Publication No. 2009-191407

Patent Document 4: Japanese Patent Application Publication No. 2011-140625

Patent Document 5: Japanese Patent Application Publication No. 2010-89373

However, while the art described in these patent documents does achieve a certain degree of water repellency or oil repellency, in order to promote a more practical implementation the adoption is still necessary of a method than can more reliably realize a satisfactory water repellency and oil repellency.

DISCLOSURE OF THE INVENTION

Accordingly, the main object of the present invention is to provide a coating film that can more reliably exhibit an excellent water repellency and an excellent oil repellency.

As a result of extensive and intensive investigations in view of the problems with the prior art, the inventor discovered that this object could be achieved by using a coating film that contains specific particles. The present invention was completed based on this discovery.

That is, the present invention relates to the water- and oil-repellent coating film described in the following.

1. A water- and oil-repellent coating film that is a coating film formed on a surface of a substance in order to impart water repellency and oil repellency, wherein (1) the coating film contains a metal oxide-containing composite particle;

(2) the metal oxide-containing composite particle contains a) a metal oxide particle and b) a covering layer that contains a polyfluoroalkyl methacrylate resin and is formed on the surface of the metal oxide particle; and (3) a value yielded by dividing the fluorine content (weight %) of the metal oxide-containing composite particle by a surface area ($m^2/g$) of the metal oxide particle is 0.025 to 0.180.

2. The water- and oil-repellent coating film according to item 1, wherein a value yielded by dividing the carbon content (weight %) of the metal oxide-containing composite particle by the surface area ($m^2/g$) of the metal oxide particle is 0.05 to 0.400.

3. The water- and oil-repellent coating film according to item 1 or 2, wherein an average primary particle diameter of the metal oxide particle is 5 to 50 nm.

4. The water- and oil-repellent coating film according to any of items 1 to 3, wherein the metal oxide particle is at least one selection from silicon oxide particles, aluminum oxide particles, and titanium oxide particles.

5. The water- and oil-repellent coating film according to any of items 1 to 4, wherein the covering layer does not contain a silicon component.

6. The water- and oil-repellent coating film according to any of items 1 to 5, wherein the coating film is porous.

7. The water- and oil-repellent coating film according to any of items 1 to 6, wherein the coating film surface that forms the outermost surface has an uneven structure that is produced by the metal oxide-containing composite particle.

8. The water- and oil-repellent coating film according to any of items 1 to 7, wherein the metal oxide-containing composite particle content in the coating film is 10 to 100 weight %.

9. The water- and oil-repellent coating film according to any of items 1 to 8, wherein the coating film additionally contains an adhesive component.

10. A packaging material comprising the water- and oil-repellent coating film according to any of items 1 to 9.

11. The packaging material according to item 10, comprising the water- and oil-repellent coating film according to any of items 1 to 9, a heat seal layer, and a base material layer in the indicated sequence.

12. The packaging material according to item 11, wherein all or a portion of the water- and oil-repellent coating film present on a region that undergoes heat sealing is embedded in the heat seal layer when heat sealing is performed.

13. The water- and oil-repellent coating film according to any of items 1 to 9, wherein the coating film is obtained by a method comprising a step of coating a surface of the substance with a dispersion in which the metal oxide-containing composite particle is dispersed.

14. A method of producing a packaged product in which a content is filled in a container, the method of producing the packaged product comprising:

(1) a step of filling the content into the container; and (2) a step of sealing the content by using the packaging material according to item 11 as a closure and heat sealing it while abutting the water- and oil-repellent coating film of the packaging material to the opening in the container.

15. The production method according to item 14, wherein all or a portion of the water- and oil-repellent coating film present on the region where the packaging material will be heat sealed is embedded in the heat seal layer when heat sealing is performed.

16. The production method according to item 14, wherein the water- and oil-repellent coating film is not formed and the heat seal layer is exposed in the region where the packaging material will be heat sealed.

17. The production method according to any of items 14 to 16, wherein the content exhibits fluidity.

18. The production method according to any of items 14 to 17, wherein the content is a liquid.

19. The production method according to any of items 14 to 18, wherein the content contains a water fraction and/or an oil component.

20. The production method according to any of items 14 to 19, wherein the viscosity of the content at 20° C. is 0.01 to 500 dPa·s.

Advantages of the Invention

Through the use of a special, covering layer-bearing metal oxide-containing composite particle, the present invention can provide a coating film that more reliably produces an excellent water repellency and an excellent oil repellency. In particular, when a microscopic and complex uneven structure is formed at the surface of the coating film by a plurality of the metal oxide-containing composite particles in succession, an even better water repellency and oil repellency can be achieved through a synergistic action between this uneven structure and the covering layer.

The coating film having these characteristic features can be favorably used with, for example, packaging materials, tableware, cookware, kitchenware, household goods, clothing, building products, structures, and transportation equipment. It can be particularly favorably used with packaging materials, starting with closures but also including, for example, molded containers, wrapping paper, trays, tubes, and bags such as sacks and pouches. In the case of use with packaging materials, the content can be a content that contains an aqueous liquid and/or an oily liquid. That is, a content that exhibits fluidity can be used. More specifically, the coating film having these characteristic features is useful for packaging materials for holding various types of contents, e.g., foods such as curry, stew, yogurt, jelly confections, pudding, and seasonings (for example, sauces for grilled meats and dressings), and also, for example, liquid cleansers and detergents, toothpastes, cosmetics such as facial cleansing creams and facial cleansing mousse, and medicines.

BRIEF DESCRIPTION OF THE DRAWINGS

FIG. 4 shows the results of observation of the surface of the coating film according to Example 2-4.

Figure 1:
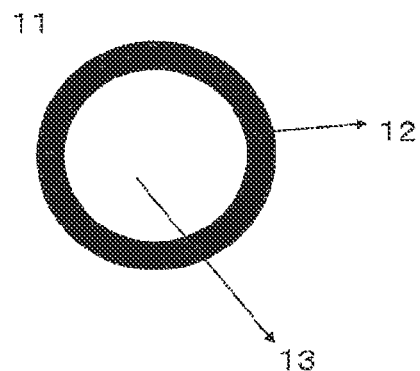
FIG. 1 is a schematic diagram of a metal oxide-containing composite particle of the present invention.

EXPLANATION OF REFERENCE NUMBERS 11 metal oxide-containing composite particle
12 covering layer
13 metal oxide particle (aggregate)
21 coating film
22 substance
23 pore
24 surface of the coating film
31 packaging material
32 heat seal layer
33 sheet-form base material
34 laminate

BEST MODE FOR CARRYING OUT THE INVENTION

The water- and oil-repellent coating film of the present invention is a coating film formed on a surface of a substance (an article) in order to impart water repellency and oil repellency, wherein (1) the coating film comprises a metal oxide-containing composite particle;

(2) the metal oxide-containing composite particle contains a) a metal oxide particle and b) a covering layer that contains a polyfluoroalkyl methacrylate resin and is formed on the surface of the metal oxide particle; and (3) the value yielded by dividing the fluorine content (weight %) of the metal oxide-containing composite particle by the surface area ($m^2/g$) of the metal oxide particle is 0.025 to 0.180.

Figure 2:
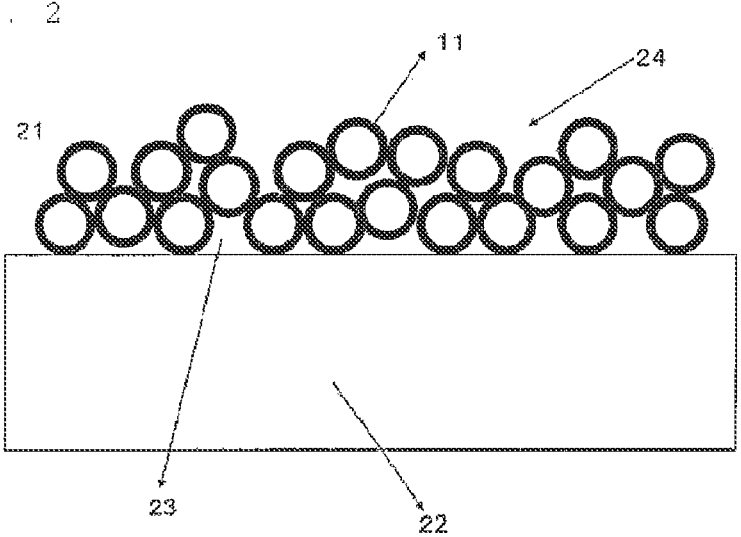
FIG. 2 is a schematic diagram of a coating film of the present invention.

A schematic diagram of the metal oxide-containing composite particle is shown in FIG. 1. As shown in FIG. 1, the metal oxide-containing composite particle 11 comprises a metal oxide particle 13 as a core and a covering layer 12 formed on the surface of the metal oxide particle 13. The core metal oxide particle 13 as a core forms an aggregate structure (porous aggregate structure) in which a plurality of metal oxide particles (primary particles) are connected three dimensionally. The covering layer 12 is formed in the interior and at the outer shell of this aggregate structure. In FIG. 1, this aggregate structure is shown schematically in a spherical form and the covering layer 12 is indicated only at the outer shell. A coating film 21 containing the metal oxide-containing composite particle 11 is shown schematically in FIG. 2. The coating film 21 is formed at the surface of a substance 22 and includes the metal oxide-containing composite particles 11 and the voids 23 formed between these particles. The surface 24 (outermost surface) of the coating film 21 desirably forms an uneven structure (uneven surface) due to the plurality of metal oxide-containing composite particles 11. That is, in order to obtain an even greater water repellency and oil repellency, the coating film of the present invention preferably has an uneven structure formed by the metal oxide particles at the surface of the coating film.

Thus, a high water repellency and a high oil repellency are exhibited due to an interaction between the uneven surface 24 described above and the covering layer 12 containing a polyfluoroalkyl methacrylate resin and formed on the surface of the metal oxide-containing composite particle 11. In addition, the coating film of the present invention can provide a uniform water repellency and oil repellency over the entire coating film surface because all of the metal oxide-containing composite particles present in the coating film of the present invention are covered by a prescribed amount of the polyfluoroalkyl methacrylate resin-containing covering layer 12. In other words, because the individual metal oxide-containing composite particles have the covering layer 12 in an amount sufficient for the development of a high water repellency and a high oil repellency, a high water repellency and a high oil repellency are exhibited over the entire coating film uniformly, and as a result a uniform water repellency and uniform oil repellency are imparted to the substance 22.

Even in the case of a material (particularly an aqueous or oily liquid) that would stick to the outermost surface of a coating film, such a material is repelled by the water repellency and oil repellency of the coating film of the present invention, and as a result the sticking of such a material to the coating film 21 can be prevented.

1. The Substance

There are no particular limitations on the substance that is the target for the formation of the coating film of the present invention (i.e., the target of water repellency and oil repellency). The substance may be, for example, a metal, plastic, ceramic, rubber, fibrous material (paper, nonwoven fabric, woven fabric, and so forth), or a composite material thereof. It may be a finished product, semifinished product, or a starting material therefor.

More specifically, this substance (finished product and so forth) can be a broad range of materials as used for, e.g., packaging materials, household products (for example, eyeglasses, rain gear, luggage or briefcases), building materials (for example, roofing materials, wallpaper, flooring, ceiling materials, tile, and glazing), tableware, cooking utensil (for example, pans or pots, drip trays for gas stove tops, oil guard panels, and top plates for induction stove tops), kitchenware, sporting goods, clothing (for example, caps or hats, shoes, gloves, and coats), structures (for example, building walls, bridges, and towers), transportation equipment (outer body surfaces for, for example, vehicles, motorcycles, rail cars, and ships), cosmetics, medicines, toys, and identification tools.

Packaging materials are particularly suitable as the substance in the present invention. These packaging materials encompass both packaging as a finished product (completed product) and the starting materials for packaging. The finished product (completed product) can be exemplified first of all by lids or closures for containers but also by packaging such as molded containers, wrapping paper, trays, tubes, and bags (pouches and so forth). The starting material for packaging can be exemplified by the base material and a laminate containing a heat seal layer. That is, it can be exemplified by a packaging material comprising the water- and oil-repellent coating film of the present invention, a heat seal layer, and a base material in the indicated sequence (this is a packaging material according to the present invention). Embodiments are given below of representative examples of packaging materials according to the present invention.

2. The Coating Film

The coating film according to the present invention contains metal oxide-containing composite particles. The content of the metal oxide-containing composite particles in the coating film can be set as appropriate in conformity with, for the example, the desired water repellency and oil repellency, but is generally preferably 10 to 100 weight % and particularly preferably is 30 to 100 weight %. That is, a proportionally higher water repellency and oil repellency can be obtained in the present invention as the content of the metal oxide-containing composite particles increases to 100 weight %.

The amount of application of the coating film (weight after drying) to the substance is not limited and may be established as appropriate in conformity to, for example, the desired water- and oil-repellency, the content of the metal oxide-containing composite particles, and so forth, but can generally be set in the range from 0.01 to 30 $g/m^2$ and in particular can be set in the range from 0.1 to 30 $g/m^2$. Accordingly, for example, it can be favorably set in the range from about 1 to 30 $g/m^2$ and particularly the range from 2 to 8 $g/m^2$.

1) The Metal Oxide-Containing Composite Particle and its Preparation 1-1) The Metal Oxide-Containing Composite Particle The metal oxide-containing composite particle contains a) a metal oxide particle and b) a covering layer that contains a polyfluoroalkyl methacrylate resin and is formed on the surface of the metal oxide particle.

The metal oxide particle according to above a) should be able to form the core of the metal oxide-containing composite particle but is not otherwise limited, and, for example, at least one particle (powder) selected from silicon oxide, titanium oxide, aluminum oxide, zinc oxide, and so forth, can be used. At least one selection from silicon oxide particles, titanium oxide particles, and aluminum oxide particles is particularly preferred for the present invention. Known or commercially available metal oxide particles can be used for these metal oxide particles as such. The average primary particle diameter of the metal oxide particle is not limited, but is generally 5 to 50 nm while 7 to 30 nm is particularly desirable. An even better water repellency and oil repellency can be obtained by operating within this particle diameter range.

The average primary particle diameter of the metal oxide particle for the present invention can be measured using a transmission electron microscope or a scanning electron microscope. More specifically, the average primary particle diameter can be determined by taking a photograph using a transmission electron microscope or a scanning electron microscope; measuring the diameter of at least 200 particles on this photograph; and calculating an arithmetic average value therefrom.

Known or commercially available products may be used for these nanolevel metal oxide particles. Examples for the silicon oxide are AEROSIL 200 (product names, "AEROSIL" is a registered trademark, products from Nippon Aerosil Co., Ltd. The same applies hereinafter.), AEROSIL 130, AEROSIL 300, AEROSIL 50, AEROSIL 200FAD, and AEROSIL 380. An example for the titanium oxide is AEROXIDE $TiO_2$ T805 (product name, product from Evonik-Degussa GmbH). An example for the aluminum oxide is AEROXIDE Alu C 805 (product name, product from Evonik-Degussa GmbH).

The covering layer according to above b) contains a polyfluoroalkyl methacrylate resin. The use of this resin results in the formation on the particle surface of a strong covering layer that has a relatively high adhesiveness due to an excellent affinity with, the metal oxide particle (particularly the silicon oxide particle), and can also exhibit a high water- and oil-repellency. Known or commercially available resins can be used for this resin. Commercially available products can be exemplified by CHEMINOX FAMAC-6 (product name, product from UNIMATEC Co., Ltd. (Japan)), ZONYL™ Fluoromonomer code 421480 (product name, product from Sigma-Aldrich (USA)), SCFC-65530-66-7 (product name, product from Maya High Purity Chemi (China)), FC07-04 to -10 (product names, products from Fluory, Inc. (USA)), CB INDEX:58 (product name, product from Wilshire Chemical Co., Inc. (USA)), ASAHIGUARD AG-E530 and ASAHIGUARD AG-E060 (product names, products from Asahi Glass Co., Ltd.), TEMAC N (product name, product from Top Fluorochem Co., Ltd. (China)), ZONYL 7950 (product name, product from SIGMA-RBI (Switzerland)), 6100840 to 6100842 (product names, products from Weibo Chemical Co., Ltd. (China)), and CB INDEX:75 (product name, product from ABCR GmbH & Co. KG (Germany)).

Among the preceding, for example, a copolymer obtained by the copolymerization of a) polyfluorooctyl methacrylate, b) 2-N,N-diethylaminoethyl methacrylate, c) 2-hydroxyethyl methacrylate, and d) 2,2'-ethylenedioxydiethyl dimethacrylate can be favorably used as this resin in order to achieve an even better water- and oil-repellency. A commercially available resin as referenced above can also be used here.

In the present invention, the value (value A) obtained by dividing the fluorine content (weight %) of the metal oxide-containing composite particle by the surface area ($m^2/g$) of the metal, oxide particle is 0.025 to 0.180 and is preferably 0.030 to 0.175. In addition, the value (value B) obtained by dividing the carbon content (weight %) for the metal oxide-containing composite particle by the surface area ($m^2/g$) of the metal oxide particle is desirably 0.05 to 0.400 and particularly 0.06 to 0.390. This carbon content and fluorine content are indexes in the present invention that indicate the degree of coverage, and larger numerical values for these indicate a greater amount of coverage. An excellent adhesiveness to the metal oxide particle surface and an excellent water repellency and oil repellency can be achieved in the present invention by obeying the prescribed amounts of coverage (the carbon content and the fluorine content and particularly the fluorine content). The desired water repellency and oil repellency are not obtained when the value yielded by dividing the fluorine content (weight %) by the surface area ($m^2/g$) of the metal oxide particle is less than 0.025. It is difficult to obtain the desired water repellency and oil repellency when the value yielded by dividing the carbon content (weight %) by the surface area ($m^2/g$) of the metal oxide particle is less than 0.05. On the other hand, production of the metal oxide-containing composite particle itself is quite problematic when the value yielded by dividing the fluorine content (weight %) by the surface area ($m^2/g$) of the metal oxide particle exceeds 0.180. In addition, it is difficult to produce the metal oxide-containing composite particle when the value yielded by dividing the carbon content (weight %) by the surface area ($m^2/g$) of the metal oxide particle exceeds 0.400. Thus, the value A desirably obeys the prescribed range in order to achieve an excellent water repellency and oil repellency, and the value B desirably also obeys the prescribed range in order to obtain an even better water repellency and oil repellency.

The carbon content in the metal oxide-containing composite particle is measured in the present invention by the following method: a (sample) is heated to at least 300° C. in an oxygen atmosphere to convert the carbon contained in the surface hydrophobic groups to CO and the carbon content present at the surface of the (sample) is determined with a microquantitative carbon analyzer. For the fluorine content in the metal oxide-containing composite particle in the present invention, the sample is baked in a ring furnace at 1000° C.; the produced gas is recovered by steam distillation; and detection and quantitation as the fluoride ion are performed on the recovered solution by ion chromatography. The surface area ($m^2/g$) (specific surface area) was determined by the BET one-point method using a Macsorb (from Mountech Co., Ltd.). 30 volume % nitrogen/70 volume helium was used as the adsorption gas. Sample pretreatment was carried out by ventilating with the adsorption gas for 10 minutes at 100° C. The cell holding the sample was then cooled with liquid nitrogen; the temperature was raised to room temperature after the completion of adsorption; and the surface area of the sample was determined from the amount of desorbed nitrogen gas. The specific surface was determined by dividing by the mass of the sample.

1-2) Preparation of the Metal Oxide-Containing Composite Particle

The method of producing the metal oxide-containing composite particle is not particularly limited, and the covering layer may be formed on the metal oxide particle (powder) by, for example, a known coating method or granulation method, using a polyfluoroalkyl methacrylate resin as the coating material. For example, the metal oxide-containing composite particle can be favorably produced by a production method comprising a step (the coating step) of coating the metal oxide particle with a coating liquid in which a liquid polyfluoroalkyl methacrylate resin is dissolved or dispersed in a solvent.

This production method can advantageously use a polyfluoroalkyl methacrylate resin that is a liquid at normal temperature (25° C.) and normal pressure for the polyfluoroalkyl methacrylate resin. The commercially available products provided above as examples can also be used as this polyfluoroalkyl methacrylate resin.

The solvent used in the coating liquid is not particularly limited, and, while water or an organic solvent such as alcohol or toluene can be used, the use of water is preferred for the present invention. That is, the coating liquid is preferably a coating liquid in which the polyfluoroalkyl methacrylate resin is dissolved and/or dispersed in water.

The content of the polyfluoroalkyl methacrylate resin in this coating liquid is not particularly limited, but preferably generally ranges from 10 to 80 weight %, particularly from 15 to 70 weight %, and more particularly from 20 to 60 weight %.

The method used to coat the coating liquid on the surface of the metal oxide particle may be a known method, and, for example, a spray method, immersion method, stirred granulation method, and so forth, may be used. In particular, coating by a spray method is particularly preferred in the present invention from the standpoint of obtaining an excellent uniformity.

After the coating liquid has been applied, the metal oxide-containing composite particle can be obtained by removing the solvent using a heat treatment. The heat treatment temperature is preferably generally about 150 to 250° C. and particularly preferably is 180 to 200° C. There are no limitations on the atmosphere for the heat treatment, but an inert gas (nonoxidizing) atmosphere such as, for example, nitrogen gas, argon gas, and so forth, is desirable. For example, as necessary a sequence of steps comprising an additional coating step and heat treatment step can be performed one or more times. This can be used to implement a favorable control of the amount of coverage.

2) Other Components in the Coating Film

In addition to the metal oxide-containing composite particle described above, the coating film of the present invention may contain other components within a range in which the effects of the present invention are not impaired. Examples here are adhesives (for example, heat seal agents), colorants, dispersing agents, anti-settling agents, viscosity modifiers, printing protectants, and so forth.

In particular, in conformity to, for example, the type of article with which the coating film of the present invention is used, the incorporation of an adhesive (adhesive component) is effective for further raising the adhesive strength of the coating film to the article and the adhesive strength among the metal oxide-containing composite particles. There are no particular limitations on the adhesive that can be used in this case, and the known and commercially available adhesives can be used. Examples here adhesives (particularly heat seal agents) such as polyolefin resins, polyester resins, polyurethane resins, epoxy resins, acrylic resins, and vinyl resins. More specifically, the following can be used as the heat seal agent: low-density polyethylene; medium-density polyethylene; high-density polyethylene; straight-chain (linear) low-density polyethylene; polypropylene; ethylene-vinyl acetate copolymers; ionomer resins; ethylene-acrylic acid copolymers; ethylene-ethyl acrylate copolymers; ethylene-methacrylic acid copolymers; ethylene-methyl methacrylate copolymers; ethylene-propylene copolymers; methylpentene polymers; polybutene polymers; acid-modified polyolefin resins provided by the modification of a polyolefin resin, e.g., polyethylene or polypropylene, with an unsaturated carboxylic acid such as acrylic acid, methacrylic acid, maleic acid, maleic anhydride, fumaric acid, or itaconic acid; polyvinyl acetate resins; poly(meth)acrylic resins; polyacrylonitrile resins; polyvinyl chloride resins; other thermal adhesive resins; blended resins from the preceding; copolymers containing combinations of the monomers that constitute the above polymers; and modified resins.

When a heat seal agent is used, a coating film that exhibits an even better adhesiveness for the surface of the substance can be formed by, for example, carrying out coating in the "3. Method of forming the coating film" described below using a liquid dispersion in which particles (powder) of the heat seal agent are dispersed with the metal oxide-containing composite particles and thereafter melting the heat seal agent in the heat treatment step in the "3. Method of forming the coating film" described below. The content of the adhesive agent in the coating film when an adhesive agent is used may generally be set as appropriate within the range of 20 to 80 weight, in the coating film.

3. Method of Forming the Coating Film

The method of forming the coating film of the present invention is not particularly limited and, inter alia, known methods can be used. In particular, the coating film is favorably formed in the present invention by a method comprising a step of coating a surface of the substance with a liquid dispersion that contains the metal oxide-containing composite particles. That is, a water- and oil-repellent coating film can be obtained by coating by a wet method and thereafter removing the solvent. When a perfluoroalkylsilane, which is a fluorinated water- and oil-repellent agent according to the prior art, is used, a catalyst must be added or the pH of the water- and oil-repellent agent must be adjusted in order to control the hydrolysis reaction of the alkoxysilane group therein; in contrast to this, such a step may be not present in the present invention and a desired coating film can be formed relatively simply. Moreover, the use of water or the like for the solvent makes it possible to also keep the load on the environment to a minimum.

The solvent used in the liquid dispersion is not particularly limited and can be exemplified by water, alcohol (ethanol), cyclohexane, toluene, acetone, IPA, propylene glycol, hezylene glycol, butyl diglycol, pentamethylene glycol, normal-pentane, normal-hexane, hexyl alcohol, and so forth.

The amount of the metal oxide-containing composite particles dispersed in the organic solvent is generally established as appropriate in the range from about 20 to 50 g/L (liter) in conformity to, for example, the type of substance, the degree of water repellency and oil repellency, and so forth.

As indicated above in "2) Other components in the coating film", an adhesive (and particularly a heat seal agent) may also be contained in the liquid dispersion. More specifically, particles of an adhesive component can be dispersed in the liquid dispersion. The adhesive components given above in "2) Other components in the coating film" can be used as this adhesive component. In addition, the other components given above in "2) Other components in the coating film" may also be contained in the liquid dispersion.

The method for coating the liquid dispersion on the surface of the material is not limited and known methods may be used. For example, any known method, such as roll coating, gravure coating, bar coating, doctor blade coating, comma coating, partial coating, brush application, and so forth, can be used.

The amount of application during coating with the liquid dispersion is not limited, and the metal oxide-containing composite particle weight after the coating has been dried can be set as appropriate, for example, within the range from 0.01 to 30 g/m$^2$ and preferably 0.1 to 30 g/m$^2$. Accordingly, it can also be adjusted so as to provide, for example, about 50 to 600 mg/m$^2$ and particularly 200 to 500 mg/m$^2$.

A drying step may be carried out after the liquid dispersion has been coated on the surface of the substance. This drying may be a spontaneous drying or drying with the application of heat. In the case of drying with the application of heat, heating may generally be carried out at not more than 200° C. and preferably at not more than 100° C.

After the liquid dispersion has been coated on the surface of the substance, a heat treatment step may also be performed in the present invention, either after the drying step or instead of the drying step. In particular, when a heat seal agent is contained in the liquid dispersion as an adhesive component, the coating film can be strongly anchored to the surface of the substance by melting the heat seal agent by subjecting the coating film on the surface of the substance to a heat treatment. By doing this, a coating film can be formed for which there is a better inhibition of exfoliation and flaking. The heat treatment temperature may be set as appropriate in conformity with, for example, the nature of the heat seal agent being used, and may generally be within the range of about 150 to 250° C. There are no limitations on the heat treatment atmosphere, but the operation may generally be done in the atmosphere or in an oxidizing atmosphere.

4. The Properties of the Coating Film

The water- and oil-repellent coating film of the present invention contains the metal oxide-containing composite particles, and in particular the surface of the coating film preferably has an uneven structure (an approximately fractal structure) formed by the metal oxide-containing composite particles. More specifically, it desirably has a surface formed by voids and the particles themselves, and that is formed by the connection of a plurality of the metal oxide-containing composite particles. By this structure together with the metal oxide-containing composite particle having the prescribed covering layer, an even better water repellency and oil repellency can be performed. That is, an even better water repellency and oil repellency can be obtained as a result of the surface with its uneven structure being substantially composed of this covering layer. In this case, particles other than the metal oxide-containing composite particle may be included, within a range in which the profitable effects of the present invention are not impaired, as particles that contribute to the formation of the uneven structure. The uneven structure of the surface of the coating film can be observed using a scanning electron microscope. Example 2-4, infra, is shown in FIG. 4 as a representative example.

The thickness of the coating film is not particularly limited, but generally can be set as appropriate within the range from 0.5 to 30 μm. In particular, about 1 to 8 μm is preferred when the packaging material has a structure in which the coating film is embedded in the heat seal layer during heat sealing.

With regard to the water repellency possessed by the coating film, the contact angle versus pure water (25° C.) is generally preferably at least 140° and is particularly preferably at least 150°. With regard to the oil repellency, the contact angle versus the edible oil:olive oil (25° C.) is preferably at least 130° and is particularly preferably at least 140°. Moreover, while there are no limitations on the roll off angle (olive oil) for the coating film, it is generally preferably 5 to 200.

<Embodiments of the Present Invention for Packaging Materials>

Figure 3:
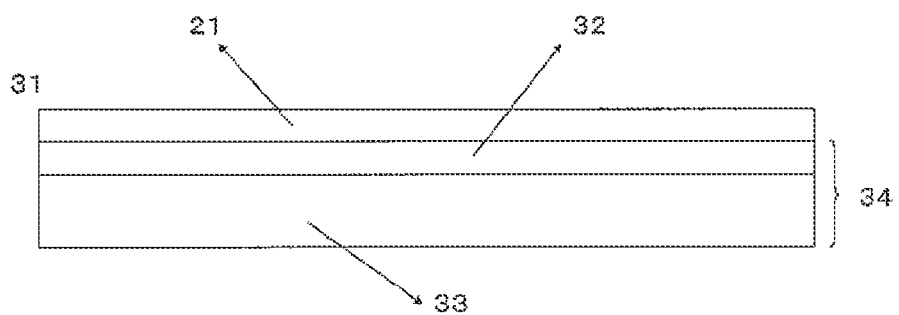
FIG. 3 is a diagram that shows the layer structure of a packaging material that includes a coating film of the present invention.

Embodiments are given below for the production of packaging materials using a laminate containing a heat seal layer and a sheet-form base material as the substance in above 1. As shown in FIG. 3, in the packaging material 31, a coating film 21 is formed as the outermost layer on a laminate 34 in which a heat seal layer 32 is laminated so as to be in contact with a sheet-form base material 33.

a) Structure of the Laminate

Known materials can be used for the sheet-form base material 33. For example, paper, synthetic paper, a resin film, a resin film bearing a vapor-deposited layer, an aluminum foil, or another metal foil can be favorably used by itself, or a composite material comprising the above layer or a laminate comprising the above layer can be favorably used.

There are also no limitations on the lamination method for the sheet-form base material or the method for laminating the sheet-form base material with the heat seal layer, and, for example, known methods can be used, e.g., dry lamination methods, extrusion lamination methods, wet lamination methods, heat lamination methods, and the like.

The thickness of the sheet-form base material is not particularly limited, and the range used for known packaging materials can be used. For example, this is generally preferably about 1 to 500 μm.

The heat seal layer 32 is disposed as the outermost layer (surfacemost) of the laminate 34. Known heat seal layers can be used for the heat seal layer 32. For example, besides a known sealant film, a layer formed by an adhesive, e.g., a lacquer-type adhesive, an easy-peel adhesive, or a hot-melt adhesive, can be used.

There are no limitations on the main component of the heat seal layer, and the same main components as for the previously described heat seal agents can be used. More specifically, the following can be used: low-density polyethylene; medium-density polyethylene; high-density polyethylene; straight-chain (linear) low-density polyethylene; polypropylene; ethylene-vinyl acetate copolymers; ionomer resins; ethylene-acrylic acid copolymers; ethylene-ethyl acrylate copolymers; ethylene-methacrylic acid copolymers; ethylene-methyl methacrylate copolymers; ethylene-propylene copolymers; methylpentene polymers; polybutene polymers; acid-modified polyolefin resins provided by the modification of a polyolefin resin, e.g., polyethylene or polypropylene, with an unsaturated carboxylic acid such as acrylic acid, methacrylic acid, maleic acid, maleic anhydride, fumaric acid, or itaconic acid; polyvinyl acetate resins; poly(meth)acrylic resins; polyacrylonitrile resins; polyvinyl chloride resins; other thermal adhesive resins; blended resins thereof; copolymers containing combinations of the monomers that constitute the above polymer; and modified resins. With regard to the structure of the heat seal layer, a single layer of a sealant film can be used or a sealant film composed of two or more layers as provided by co-extrusion or extrusion lamination can also be used.

The thickness of the heat seal layer is not particularly limited, but, considered in terms of productivity and cost, is preferably about 1 to 100 μm and is more preferably about 3 to 50 μm. When heat sealing is carried out, all or a portion of the coating film present on the region undergoing heat sealing is embedded in the heat seal layer in the packaging material of the present invention and heat sealing can then be performed due to the heat seal layer becoming surfacemost. Due to this, the thickness is desirably set to a thickness, within the thickness range indicated above, at which the coating film can be embedded in the heat seal layer as much as possible.

Insofar as the effects of the present invention are not impaired, the various layers employed in known packaging materials may as necessary be laminated in a freely selected position to the sheet-form base material in the laminate 34 for the purpose of providing various properties (for example, resistance to moisture permeability, resistance to oxygen permeability, opacity, heat insulation, impact resistance, and so forth). Examples in this regard are a print layer, print protection layer (i.e., OP layer), colored layer, adhesive layer, adhesion-reinforcing layer, primer coat layer, anchor coat layer, anti-skid agent layer, lubricant layer, and anti-fogging agent layer.

b) Formation of the Coating Film on the Surface of the Laminate

An excellent water repellency and an excellent oil repellency can be exhibited by the packaging material of the present invention when the coating film of the present invention is formed on the surface of the heat seal layer of the aforementioned laminate. That is, the coating film of the present invention is in particular preferably formed adjacent to the heat seal layer.

The amount (weight after drying) of the coating film formed on the surface of the laminate is not limited, but generally can be established as appropriate within the range from 0.01 to 30 $g/m^2$ and preferably within the range from 0.1 to 30 $g/m^2$. Setting the amount of attachment in this range makes it possible to obtain an even better water repellency and oil repellency for a long time and is also more advantageous in terms of cost and inhibiting exfoliation of the coating film. Accordingly, for example, the amount of attachment can be in the range from 0.01 to 10 $g/m^2$, particularly 0.2 to 1.5 $g/m^2$, and even more particularly 0.2 to 1 $g/m^2$.

The coating film preferably forms a porous layer in the present invention, and its thickness is preferably about 0.1 to 5 μm and is more preferably about 0.2 to 2.5 μm. Since a large amount of air can be contained in this layer by the attachment of the coating film in the form of such a porous layer, an even better water repellency and oil repellency can then be exhibited.

The surface of the coating film in the packaging material of the present invention also desirably has an uneven structure formed by the connection of the metal oxide-containing composite particles. This can achieve an even better water repellency and oil repellency.

The coating film may be formed over the entire surface on the heat seal layer side (the entire surface on the opposite side from the sheet-form base material side) or may be formed in a region that excludes the region in which the heat seal layer undergoes heat sealing (i.e., the bonding margin).

Even in the case of the attachment of the coating layer over the entire surface on the heat seal layer side, heat sealing is substantially not impaired in the present invention because all or a portion of the coating film present in the region that undergoes heat sealing is buried in this heat seal layer, and thus from the standpoint of industrial production, it is preferred that the coating layer attaches over the entire surface of the heat seal layer.

The packaging material 31, for example, can be favorably produced by the following method. That is, the packaging material can be produced by a method of producing a packaging material that contains a sheet-form base material and a heat seal layer, wherein the method comprises a step (the coating film formation step) in which the coating film is formed by coating a liquid dispersion containing the metal oxide-containing composite particles in a solvent on all or a portion of the outermost surface of the heat seal layer in a laminate that contains a sheet-form base material and a heat seal layer wherein the heat seal layer is disposed as the outermost layer.

In the coating film formation step, the coating film is formed by coating a liquid dispersion containing the metal oxide-containing composite particles in a solvent on all or a portion of the outermost surface of the heat seal layer in a laminate that comprises a sheet-form base material and a heat seal layer wherein the heat seal layer is disposed as the outermost layer.

The laminate described in above a) can be used as the laminate. Thus, the same sheet-form base material, heat seal layer, and other layers as described above can be used.

A liquid dispersion prepared by the dispersion of at least the metal oxide-containing composite particles(powder) in a solvent is used as the liquid dispersion. The metal oxide-containing composite particle described above in "1-1) The metal oxide-containing composite particle" can be used as the metal oxide-containing composite particle here.

The solvent should in particular not degrade the metal oxide-containing composite particles that are used, but is not otherwise limited and, for example, can be selected as appropriate from among organic solvents, e.g., alcohol (ethanol), cyclohexane, toluene, acetone, IPA, propylene glycol, hexylene glycol, butyl diglycol, pentamethylene glycol, normal-pentane, normal-hexane, and hexyl alcohol. There are no limitations on the amount of metal oxide-containing composite particles dispersed in the solvent, and, for example, this can be set at about 10 to 200 g/L. Accordingly, it may also be adjusted, for example, within the range of 10 to 100 g/L.

Within a range in which the advantages of the present invention are not impaired, the liquid dispersion in the present invention may as appropriate incorporate other additives as necessary. For example, a dispersing agent, colorant, anti-settling agent, viscosity modifier, and so forth, may be added. Moreover, as has been indicated above, the powder of an adhesive (particularly a heat seal agent) may also be dispersed in this liquid dispersion in order to further raise the adhesive strength of the coating film.

Any known method, for example, roll coating, gravure coating, bar coating, doctor blade coating, comma coating, partial coating, brush application, and so forth, can be employed as the coating method for applying the liquid dispersion. When, for example, roll coating or the like is used, a coating step can be performed by forming the coating film is formed on the heat seal layer using a liquid dispersion prepared by dispersing at least the metal oxide-containing composite particles in a solvent.

After the coating film formation step, a step of drying the coating film may be performed prior to a heating step. This drying method may be a spontaneous drying or forced (application of heat) drying. In the case of drying with the application of heat, a temperature generally of not more than 200° C. and preferably not more than 100° C. may be used.

After the liquid dispersion has been coated on the surface of the substance, a heat treatment step may also be performed in the present invention, either after the drying step or instead of the drying step. In particular, when a heat seal agent is contained in the liquid dispersion as an adhesive component, the coating film can be firmly anchored to the surface of the substance by melting the heat seal agent by subjecting the coating film on the surface of the substance to a heat treatment. By doing this, a coating film can be formed for which there is a better inhibition of exfoliation and flaking. The heat treatment temperature may be set as appropriate in conformity with, for example, the nature of the heat seal agent being used, and may generally be within the range of about 150 to 250° C. There are no limitations on the heat treatment atmosphere, but the operation may generally be done in the atmosphere or in an oxidizing atmosphere.

The obtained packaging material can be used as such or can be used after it has been subjected to processing. The same methods as used with known packaging materials can be used for the processing method. For example, an embossing process, a half-cutting process, a notching process, and so forth may be carried out. The packaging material of the present invention can be favorably used most prominently for lids or closures, but also for, for example, molded containers, wrapping paper, trays, tubes, and bags such as sacks and pouches.

EXAMPLES

The characteristic features of the present invention are more specifically described through the examples and comparative examples provided below. However, the scope of the present invention is not limited to or by the examples.

Example 1-1

(1) Production of the Metal Oxide-Containing Composite Particle 100 g of a fumed silica powder having an average primary particle diameter of 12 nm and a BET specific surface area of 200 $m^2/g$ (product name: AEROSIL 200, from Nippon Aerosil Co., Ltd.) was introduced into a reactor and was sprayed with 500 g of a commercially available surface-treatment agent while stirring under a nitrogen gas atmosphere. This was followed by stirring for 30 minutes at 200° C. and then cooling. A powder of surface-modified silica fine particles (fine metal oxide-containing composite particles) was thus obtained. A water-based dispersion (solid content: 20 weight %) of a copolymer of polyfluorooctyl methacrylate, 2-N,N-diethylaminoethyl methacrylate, 2-hydroxyethyl methacrylate, and 2,2'-ethylenedioxydiethyl dimethacrylate was used as the treatment agent here. The carbon content and fluorine content of the obtained surface-modified silica fine particles (powder) are shown in Table 1.

(2) Production of the Liquid Dispersion 30 weight parts of the surface-modified silica fine particles obtained in above (1) was added to 200 weight parts ethanol with mixing to prepare a liquid dispersion.

(3) Formation of the Coating Film

Using a co-extruded film composed of polyethylene terephthalate (thickness=12 μm)/polyurethane-type dry laminate adhesive/aluminum foil (20 μm)/polyurethane-type dry laminate adhesive/(polyethylene/polypropylene) as a laminate, the liquid dispersion prepared in above (2) was coated with a bar coater on the polypropylene surface so as to provide a coating rate after drying of 3 $g/m^2$. This was followed by heating for 15 seconds in a 180° C. oven to obtain a sample (packaging material) according to Example 1-1.

Example 1-2

A sample (packaging material) was prepared proceeding as in Example 1-1, but changing the 500 g of the surface-treatment agent to 300 g. The carbon content and fluorine content of the obtained surface-modified silica fine particles (powder) are shown in Table 1.

Example 1-3

A sample was prepared proceeding as in Example 1-1, but changing the 500 g of the surface-treatment agent to 800 g. The carbon content and fluorine content of the obtained surface-modified silica fine particles (powder) are shown in Table 1.

Example 1-4

A sample (packaging material) was prepared proceeding as in Example 1-1, but changing the 500 g of the surface-treatment agent to 25 g and using a fumed silica powder having an average primary particle diameter of 30 nm and a BET specific surface area of 50 $m^2/g$ (product name: AEROSIL 50, from Nippon Aerosil Co., Ltd.) as the metal oxide particles. The carbon content and fluorine content of the obtained surface-modified silica fine particles (powder) are shown in Table 1.

Example 1-5

A sample (packaging material) was prepared proceeding as in Example 1-1, but using a fumed silica powder having an average primary particle diameter of 30 nm and a BET specific surface area of 50 $m^2/g$ (product name: AEROSIL 50, from Nippon Aerosil Co., Ltd.) as the metal oxide particles. The carbon content and fluorine content of the obtained surface-modified silica fine particles (powder) are shown in Table 1.

Example 1-6

A sample (packaging material) was prepared proceeding as in Example 1-1, but changing the 500 g of the surface-treatment agent to 750 g and using a fumed silica powder having an average primary particle diameter of 7 nm and a BET specific surface area of 300 $m^2/g$ (product name: AEROSIL 300, from Nippon Aerosil Co., Ltd.) as the metal oxide particles. The carbon content and fluorine content of the obtained surface-modified silica fine particles (powder) are shown in Table 1.

Comparative Example 1-1

A sample was prepared proceeding as in Example 1-1, but changing the 500 g of the surface-treatment agent to 20 g. The carbon content and fluorine content of the obtained surface-modified silica fine particles (powder) are shown in Table 1.

Comparative Example 1-2

A sample (packaging material) was prepared proceeding as in Example 1-1, but using 100 g trifluoropropyltrimethoxysilane as the treatment agent. The carbon content and fluorine content of the obtained surface-modified silica fine particles (powder) are shown in Table 1.

Example 2-3

A liquid dispersion was prepared according to "(2) Production of the liquid dispersion" of Example 1-1 by adding 30 weight parts of the surface-modified silica fine particles and a commercially available heat seal agent (100 weight parts of a polypropylene-type heat seal agent liquid dispersion (solid content=18 weight %, the same applies hereinafter.)) to 200 weight parts of an organic solvent (toluene) with mixing. A sample (packaging material) was prepared proceeding as in Example 1-1, but using the obtained liquid dispersion.

Example 2-2

A liquid dispersion was prepared according to "(2) Production of the liquid dispersion" of Example 1-2 by adding 30 weight parts of the surface-modified silica fine particles and a commercially available heat seal agent (100 weight parts of a polypropylene-type heat seal agent liquid dispersion) to 200 weight parts of an organic solvent (toluene) with mixing. A sample (packaging material) was prepared proceeding as in Example 1-2, but using the obtained liquid dispersion.

Example 2-3

A liquid dispersion was prepared according to "(2) Production of the liquid dispersion" of Example 1-3 by adding 30 weight parts of the surface-modified silica fine particles and a commercially available heat seal agent (100 weight parts of a polypropylene-type heat seal agent liquid dispersion) to 200 weight parts of an organic solvent (toluene) with mixing. A sample (packaging material) was prepared proceeding as in Example 1-3, but using the obtained liquid dispersion.

Example 2-4

A liquid dispersion was prepared according to "(2) Production of the liquid dispersion" of Example 1-4 by adding 30 weight parts of the surface-modified silica fine particles and a commercially available heat seal agent (100 weight parts of a polypropylene-type heat seal agent liquid dispersion) to 200 weight parts of an organic solvent (toluene) with mixing. A sample (packaging material) was prepared proceeding as in Example 1-4, but using the obtained liquid dispersion.

Example 2-5

A liquid dispersion was prepared according to "(2) Production of the liquid dispersion" of Example 1-5 by adding 30 weight parts of the surface-modified silica fine particles and a commercially available heat seal agent (100 weight parts of a polypropylene-type heat seal agent liquid dispersion) to 200 weight parts of an organic solvent (toluene) with mixing. A sample (packaging material) was prepared proceeding as in Example 1-5, but using the obtained liquid dispersion.

Example 2-6

A liquid dispersion was prepared according to "(2) Production of the liquid dispersion" of Example 1-6 by adding 30 weight parts of the surface-modified silica fine particles and a commercially available heat seal agent (100 weight parts of a polypropylene-type heat seal agent liquid dispersion) to 200 weight parts of an organic solvent (toluene) with mixing. A sample (packaging material) was prepared proceeding as in Example 1-6, but using the obtained liquid dispersion.

Comparative Example 2-1

A liquid dispersion was prepared according to "(2) Production of the liquid dispersion" of Comparative Example 1-1 by adding 30 weight parts of the surface-modified silica fine particles and a commercially available heat seal agent (100 weight parts of a polypropylene-type heat seal agent liquid dispersion) to 200 weight parts of an organic solvent (toluene) with mixing. A sample (packaging material) was prepared proceeding as in Comparative Example 1-1, but using the obtained liquid dispersion.

Comparative Example 2-2

A liquid dispersion was prepared according to "(2) Production of the liquid dispersion" of Comparative Example 1-2 by adding 30 weight parts of the surface-modified silica fine particles and a commercially available heat seal agent (100 weight parts of a polypropylene-type heat seal agent liquid dispersion) to 200 weight parts of an organic solvent (toluene) with mixing. A sample (packaging material) was prepared proceeding as in Comparative Example 1-2, but using the obtained liquid dispersion.

Test Example 1 (Oil Repellency)

The oil repellency (25° C.) was checked for the samples prepared in the examples and comparative examples. Specifically, for each sample the surface that had been treated for water repellency and oil repellency was used as the test surface, and several drops of olive oil were dripped thereon and the status of the drops was observed. The commercial product "AJINOMOTO Olive Oil" (edible olive oil, viscosity=0.9 dPa·s (20° C.), from Ajinomoto Co., Inc.) was used as the olive oil. For the evaluation, a "◯" was assigned when oil repellency was exhibited (rolled in a ball shape), while an "X" was assigned when oil repellency was not seen (did not roll and wetting occurred). These results are given in Tables 1 and 2.

Test Example 2 (Contact Angle)

The contact angle (25° C.) was measured for the samples obtained in the examples and comparative examples. Specifically, for each sample the surface that had been treated for water repellency and oil repellency was used as the test surface, and the contact angles for pure water and olive oil (approximately 2 to 4 µL) were measured using a contact angle meter (the "DropMaster 300" solid-liquid interface analyzer from Kyowa Interface Science Co., Ltd.). For the measurement results, N=5 and the average value of these contact angles is given for the result. The commercial product "AJINOMOTO Olive Oil" (edible olive oil, from Ajinomoto Co., Inc.) was used as the olive oil. The results are given in Tables 1 and 2.

Test Example 3 (Roll Off Angle)

The roll off angle (25° C.) was measured for the samples obtained in the examples and comparative examples. Specifically, for each sample the surface that had been treated for water repellency and oil repellency was used as the test surface; this surface was fixed facing up on a horizontal flat bed using a clip; olive oil was dripped thereon from close range; the horizontal flat bed was tilted; and the angle at which the olive oil began to flow was observed. The commercial product "AJINOMOTO Olive Oil" (edible olive oil, from Ajinomoto Co., Inc.) was used as the olive oil. The results are given in Tables 1 and 2.

Test Example 4 (Wear Resistance)

The durability (wear resistance) was examined for the samples obtained in the examples and comparative examples. The test method here was based on the JIS standard, "JIS L 0849". Specifically, for each sample the surface that had been treated for with water repellency and oil repellency was used as the test surface; the wear test was performed using a wear tester (Showa Juki Co., Ltd.); and the extent of retention of the oil repellency versus olive oil was then evaluated. The following conditions were used: a dry cloth was fixed at the tip of the friction element and 100 back-and-forth rubbing excursions were run on the test surface under a 2 N load at a rate of 30 back-and-forth excursions per minute. The commercial product "AJINO-MOTO Olive Oil" (edible olive oil, from Ajinomoto Co., Inc.) was used as the olive oil. For the evaluation, a "○" was assigned when the oil repellency was maintained at the same level as in Test Example 1, while an "x" was assigned when a loss of oil repellency occurred. These results are given in Tables 1 and 2.

Test Example 5 (Heat Sealability Test)

The heat sealability was examined for the samples obtained in Examples 2-1 to 2-6 and Comparative Examples 2-1 and 2-2. Specifically, a lid was prepared by cutting a lid shape (90 mm×90 mm square shape) from the particular packaging material sample, and a package was fabricated by heat sealing this lid onto a flanged polypropylene container (molded to provide a flange width of 3.5 mm, a flange outer diameter of 75 mm×inner diameter of 68 mm, a height of approximately 68 mm, and an internal volume of approximately 155 cm$^3$). The heat sealing conditions were flat-type sealing for 1.0 second at a temperature of 200° C. and a pressure of 3 kgf/cm$^2$. A tab in the lid on the sealed package was pulled at a rate of 100 mm/minute in the direction of a 45° angle of elevation as seen from the starting point for opening, and the maximum load (N) at the beginning of opening was measured. The results are given in Table 2.

TABLE 1

| example or comparative example | blending ratios in the production of the metal oxide-containing composite particle | | | | amount of carbon | | amount of fluorine | | test data results | | | | |
|---|---|---|---|---|---|---|---|---|---|---|---|---|---|
| | metal oxide particles | | treatment agent (water-based dispersion, 20 wt % resin) (polyfluoroalkyl methacrylate resin) | | value yielded by dividing the amount of carbon (wt %) by the surface area of the starting silica | | Value yielded by dividing the amount of fluorine (wt %) by the surface area of the starting silica | | oil repel-lency | contact angle/° | | roll off angle/° | wear resis-tance |
| | AEROSIL ® | specific surface area m$^2$/g | | | (wt %) | | (wt %) | | | pure water | olive oil | | |
| Example 1-1 | 200 | 200 | 100 g | 500 g | 20.0 | 0.100 | 7.6 | 0.038 | ○ | 153.0 | 145.2 | 14 | X |
| Example 1-2 | 200 | 200 | 100 g | 300 g | 13.8 | 0.069 | 6.6 | 0.033 | ○ | 151.0 | 143.7 | 16 | X |
| Example 1-3 | 200 | 200 | 100 g | 800 g | 24.4 | 0.122 | 12.2 | 0.061 | ○ | 153.2 | 147.4 | 13 | X |
| Example 1-4 | 50 | 50 | 100 g | 25 g | 8.3 | 0.166 | 3.0 | 0.060 | ○ | 156.5 | 146.6 | 12 | X |
| Example 1-5 | 50 | 50 | 100 g | 500 g | 19.3 | 0.386 | 8.7 | 0.174 | ○ | 148.4 | 140.7 | 13 | X |
| Example 1-6 | 300 | 300 | 100 g | 750 g | 19.7 | 0.066 | 11.2 | 0.037 | ○ | 149.0 | 143.7 | 14 | X |
| Comparative Example 1-1 | 200 | 200 | 100 g | 20 g | 4.9 | 0.025 | 1.3 | 0.007 | X | 78.2 | 22.8 | 31 | X |
| Comparative Example 1-2 | 200 | 200 | 100 g | *100 g trifluoropropyl trimethoxysilane is used | 5.5 | 0.028 | 4.4 | 0.022 | X | 90.4 | 27.8 | 29 | X |

TABLE 2

| example or comparative example | blending ratios in the production of the liquid dispersion | | | | amount of carbon | | amount of fluorine | |
|---|---|---|---|---|---|---|---|---|
| | surface-modified silica fine particles | | polypropylene-type heat seal agent, 18 wt % solids fraction | toluene dilution solvent | value yielded by dividing the amount of carbon (wt %) by the surface area of the starting silica | | value yielded by dividing the amount of fluorine (wt %) by the surface area of the starting silica | |
| | starting material | quantity | | | (wt %) | | (wt %) | |
| Example 2-1 | AEROSIL 200 | 30 g | 100 g | 200 g | 20.0 | 0.100 | 7.6 | 0.038 |
| Example 2-2 | AEROSIL 200 | 30 g | 100 g | 200 g | 13.8 | 0.069 | 6.6 | 0.033 |
| Example 2-3 | AEROSIL 200 | 30 g | 100 g | 200 g | 24.4 | 0.122 | 12.2 | 0.061 |
| Example 2-4 | AEROSIL 50 | 30 g | 100 g | 200 g | 8.3 | 0.166 | 3.0 | 0.060 |

TABLE 2-continued

| Example 2-5 | AEROSIL 50 | 30 g | 100 g | 200 g | 19.3 | 0.386 | 8.7 | 0.174 |
|---|---|---|---|---|---|---|---|---|
| Example 2-6 | AEROSIL 300 | 30 g | 100 g | 200 g | 19.7 | 0.066 | 11.2 | 0.037 |
| Comparative Example 2-1 | AEROSIL 200 | 30 g | 100 g | 200 g | 4.9 | 0.025 | 1.3 | 0.007 |
| Comparative Example 2-2 | AEROSIL 200 | 30 g | 100 g | 200 g | 5.5 | 0.028 | 4.4 | 0.022 |

| example or comparative example | oil repellency | contact angle/° pure water | contact angle/° olive oil | roll off angle/° | wear resistance | heat sealability, opening strength/N |
|---|---|---|---|---|---|---|
| Example 2-1 | ○ | 147.5 | 140.1 | 19 | ○ | 15.7 |
| Example 2-2 | ○ | 145.0 | 139.7 | 21 | ○ | 16.1 |
| Example 2-3 | ○ | 146.2 | 139.2 | 17 | ○ | 15.7 |
| Example 2-4 | ○ | 148.2 | 143.0 | 17 | ○ | 15.2 |
| Example 2-5 | ○ | 142.7 | 138.8 | 22 | ○ | 16 |
| Example 2-6 | ○ | 146.4 | 138.1 | 18 | ○ | 16.3 |
| Comparative Example 2-1 | X | 84.4 | 19.7 | 34 | ○ | 17.8 |
| Comparative Example 2-2 | X | 90.1 | 22.8 | 32 | ○ | 17.1 |

As is also clear from these results, the coating films of the examples, which contain metal oxide-containing composite particles (surface-modified silica fine particles) covered at a prescribed coverage amount by a covering layer comprising a polyfluoroalkyl methacrylate resin, can exhibit a better water repellency and a better oil repellency than the comparative examples.

The invention claimed is:

1. A water- and oil-repellent coating film that is a coating film formed on a surface of a substance in order to impart water repellency and oil repellency, wherein
   (1) the coating film comprises a metal oxide-containing composite particle;
   (2) the composite particle comprises a) a metal oxide particle and b) a covering layer that contains a polyfluoroalkyl methacrylate resin and is formed on the surface of the metal oxide particle;
   (3) a value yielded by dividing the fluorine content (weight %) of the composite particle by a specific surface area ($m^2/g$) of the metal oxide particle is 0.025 to 0.180,
   (4) the coating film includes the metal oxide-containing composite particles and voids formed between these particles,
   (5) the coating film further contains an adhesive component, the component being a heat seal agent,
   (6) the coating film is formed by coating using a liquid dispersion in which particles of the heat seal agent are dispersed with the oxide-containing composite particles in a solvent and carrying out a drying step and/or a heat treatment step, and
   (7) an average primary particle diameter of the metal oxide particle is 5 to 50 nm.

2. The water- and oil-repellent coating film according to claim 1, wherein a value yielded by dividing the carbon content (weight %) of the composite particle by the surface area ($m^2/g$) of the metal oxide particle is 0.05 to 0.400.

3. The water- and oil-repellent coating film according to claim 1, wherein the metal oxide particle is at least one selected from silicon oxide particles, aluminum oxide particles, and titanium oxide particles.

4. The water- and oil-repellent coating film according to claim 1, wherein the covering layer does not contain a silicon component.

5. The water- and oil-repellent coating film according to claim 1, wherein the coating film is porous.

6. The water- and oil-repellent coating film according to claim 1, wherein the coating film surface that forms the outermost surface has an uneven surface structure that is formed by the composite particle.

7. The water- and oil-repellent coating film according to claim 1, wherein the metal oxide-containing composite particle content in the coating film is 10 to 100 weight %.

8. The water- and oil-repellent coating film according to claim 1, wherein the heat seal agent comprises polyolefin resins, polyester resins, polyurethane resins, epoxy resins, acrylic resins, or vinyl resins.

9. The water- and oil-repellent coating film according to claim 1, wherein the coating film is formed by coating using a liquid dispersion in which particles of the heat seal agent are dispersed with the oxide-containing composite particles and thereafter melting the heat seal agent.

10. The water- and oil-repellent coating film according to claim 1, wherein the polyfluoroalkyl methacrylate resin is a copolymer obtained by the copolymerization of a) polyfluorooctyl methacrylate, b) 2-N,N-diethylaminoethyl methacrylate, c) 2-hydroxyethyl methacrylate, and d) 2,2'-ethylenedioxydiethyl dimethacrylate.

11. The water- and oil-repellent coating film according to claim 1, wherein the heat seal agent is set within the range of 20 to 80 weight % in the coating film.

12. The water- and oil-repellent coating film according to claim 1, wherein the oxide particle is a fumed silica powder having an average primary particle diameter of 7-30 nm and BET specific surface area of 50-300 $m^2/g$.

13. The water- and oil-repellent coating film according to claim 1, wherein the coating film has a surface formed by voids and the composite particles themselves, and wherein the coating film is formed by the connection of a plurality of the composite particles.

* * * * *